United States Patent
Plaisant

(10) Patent No.: US 9,582,146 B2
(45) Date of Patent: Feb. 28, 2017

(54) CAUSING DISPLAY OF SEARCH RESULTS

(75) Inventor: Nicola Plaisant, Ulm (DE)

(73) Assignee: Nokia Technologies Oy, Espoo (FI)

( * ) Notice: Subject to any disclaimer, the term of this patent is extended or adjusted under 35 U.S.C. 154(b) by 307 days.

(21) Appl. No.: 13/482,230

(22) Filed: May 29, 2012

(65) Prior Publication Data

US 2013/0325844 A1    Dec. 5, 2013

(51) Int. Cl.
G06F 3/048    (2013.01)
G06F 3/0482    (2013.01)
G06F 3/0485    (2013.01)
G06F 3/0488    (2013.01)
G06F 17/30    (2006.01)

(52) U.S. Cl.
CPC .......... *G06F 3/0482* (2013.01); *G06F 3/0485* (2013.01); *G06F 3/04886* (2013.01); *G06F 17/30643* (2013.01); *G06F 2203/04806* (2013.01)

(58) Field of Classification Search
CPC ............ G06F 3/00–3/05; G06F 3/0481; G06F 3/0485; G06F 2216/07; G06F 17/30867; G06F 17/30; G06F 17/30648; G09G 5/14; G09G 2340/0485
USPC ................. 715/784–787, 830, 861, 864, 839
See application file for complete search history.

(56) References Cited

U.S. PATENT DOCUMENTS

| | | | |
|---|---|---|---|
| 7,689,916 B1 * | 3/2010 | Goel et al. ..................... | 715/711 |
| 7,934,161 B1 * | 4/2011 | Denise .......................... | 715/738 |
| 8,635,212 B1 * | 1/2014 | Bunn ................ | G06F 17/30867 |
| | | | 707/706 |
| 2002/0109709 A1 * | 8/2002 | Sagar .......................... | 345/705 |
| 2007/0152976 A1 * | 7/2007 | Townsend ............. | G06F 3/0416 |
| | | | 345/173 |

(Continued)

FOREIGN PATENT DOCUMENTS

| CN | 101356528 A | 1/2009 |
|---|---|---|
| CN | 102053788 A | 5/2011 |

(Continued)

OTHER PUBLICATIONS

International Search Report and Written Opinion for Application No. PCT/FI2013/050574 dated Nov. 7, 2013.

(Continued)

*Primary Examiner* — Tadeese Hailu
(74) *Attorney, Agent, or Firm* — Alston & Bird LLP

(57) ABSTRACT

Apparatus has at least one processor and at least one memory having computer-readable code stored thereon which when executed controls the at least one processor:
to cause a list of search results to be displayed, each of the search results being caused to be displayed with a number of elements of associated information, wherein the number is greater than or equal to zero;
after a predetermined time period in which no user input is received, to cause the number of elements of associated information that are displayed for each of plural ones of the search results to be increased; and
to respond to a user initiated scroll command after the number of elements of associated information that are caused to be displayed for each of plural ones of the search results has been increased by causing the number of elements of associated information that are displayed to be decreased.

22 Claims, 7 Drawing Sheets

(56) References Cited

U.S. PATENT DOCUMENTS

| | | | |
|---|---|---|---|
| 2008/0072139 A1* | 3/2008 | Salinas et al. ............... | 715/238 |
| 2008/0222570 A1* | 9/2008 | MacLaurin ....... | G06F 17/30554 |
| | | | 715/839 |
| 2009/0019031 A1* | 1/2009 | Krovitz et al. .................. | 707/5 |
| 2009/0228825 A1* | 9/2009 | Van Os et al. ................ | 715/780 |
| 2009/0313220 A1* | 12/2009 | Best .................. | G06F 17/30867 |
| 2010/0262928 A1* | 10/2010 | Abbott .......................... | 715/769 |
| 2011/0096096 A1* | 4/2011 | Matsuki ....................... | 345/684 |
| 2011/0119134 A1* | 5/2011 | Zivkovic ............... | G06Q 30/00 |
| | | | 705/14.58 |
| 2013/0019174 A1* | 1/2013 | Gil et al. ...................... | 715/711 |
| 2013/0111397 A1* | 5/2013 | Miyoshi et al. ............. | 715/784 |
| 2013/0198177 A1 | 8/2013 | Oldham et al. | |
| 2014/0114947 A1* | 4/2014 | Walther ............ | G06F 17/30696 |
| | | | 707/710 |

FOREIGN PATENT DOCUMENTS

| | | |
|---|---|---|
| WO | WO 2007/059503 A1 | 5/2007 |
| WO | WO 2008/147813 A1 | 12/2008 |

OTHER PUBLICATIONS

Buring, T. et al., *User International With Scatterplots on Small Screens—A Comparative Evaluation of Geometric-Semantic Zoom and Fisheye Distortion*, IEEE Transactions on Visualization and Computer Graphics, vol. 12, No. 5, Sep./Oct. 2006, pp. 829-836.

Paek, T. et al., *WaveLens: A New View onto Internet Search Results*, CHI 2004, vol. 6, No. 1, Apr. 2004, pp. 727-734.

International Preliminary Report on Patentability for International Application No. PCT/FI2013/050574 dated Dec. 11, 2014.

Office Action for Chinese Application No. 201380028237.4 dated Nov. 2, 2016.

* cited by examiner

CAUSING DISPLAY OF SEARCH RESULTS

FIELD

This specification relates generally to the displaying of search results.

BACKGROUND

It is now common for portable devices, such as mobile phones, to be programmed to perform a diverse range of functions in addition to basic call making. It is also increasingly common for portable devices to store large amounts of personal information and data files of various types. Many such portable devices are touch screen devices having only a small number of hardware keys.

SUMMARY

A first aspect of the specification provides apparatus configured:
  to cause a list of search results to be displayed, each of the search results being caused to be displayed with a number of elements of associated information, wherein the number is greater than or equal to zero;
  after a predetermined time period in which no user input is received, to cause the number of at least one further elements of associated information to be that are displayed for each of plural ones of the search results to be increased; and
  in response to a user initiated scroll command after the number of elements of associated information that are caused to be displayed for each of plural ones of the search results has been increased, to causing the number of at least one further elements of associated information to be that are displayed to be decreased.

The apparatus may be configured, after causing the number of elements of associated information that are displayed for each of plural ones of the search results to be increased, to respond to expiry of a second predetermined time period in which no user input is received by causing the number of elements of associated information that are displayed for each of plural ones of the search results to be further increased.

A first item in the list of search results may be a contact name and a first element of associated information for the first item in the list may be a primary phone number of the contact.

Another element of associated information of the first item may be an email address of the contact.

The apparatus may be responsive to user selection of an element of associated information displayed in the list of search results to activate a corresponding function.

A second item in the list of search results may be a location. An element of associated information may be an address of the location. The apparatus may be responsive to user selection of the first element to open a map application and to indicate the location on the map.

The apparatus may be further configured to:
  cause a search field for receiving a search string to be displayed on a same display area as the list of search results;
  cause a soft keypad for entering the search string to be displayed on the same display area as the list of search results; and
  to cause removal of the soft keypad in response to a user initiated scroll command.

The order in which the search results are presented may be based on relevancy rules.

The apparatus may be a touch screen device and the user initiated scroll command may be a touch screen input.

The apparatus may be a mobile telephone.

The apparatus may be further configured: in response to a user initiated zoom-in command, to increase the number of elements of associated information that are caused to be displayed for each search result.

The apparatus may be further configured: in response to a user initiated zoom-out command, to decrease the number of elements of associated information that are caused to be displayed for each search result.

The apparatus may be responsive to user selection of a function key adjacent each search result to cause a primary function associated with each respective search result to be executed.

A second aspect of the specification provides a method comprising:
  causing a list of search results to be displayed, each of the search results being caused to be displayed with a number of elements of associated information, wherein the number is greater than or equal to zero;
  after a predetermined time period in which no user input is received, causing the number of elements of associated information that are displayed for each of plural ones of the search results to be increased; and
  in response to a user initiated scroll command after the number of elements of associated information that are caused to be displayed for each of plural ones of the search results has been increased, causing the number of elements of associated information that are displayed to be decreased.

The method may comprise, after causing the number of elements of associated information that are displayed for each of plural ones of the search results to be increased, responding to expiry of a second predetermined time period in which no user input is received by causing the number of elements of associated information that are displayed for each of plural ones of the search results to be further increased.

A first item in the list of search results may be a contact name and a first element of associated information for the first item in the list may be a primary phone number of the contact.

Another element of associated information of the first item may be an email address of the contact.

The method may comprise responding to user selection of an element of associated information displayed in the list of search results by activating a corresponding function.

A second item in the list of search results may be a location. An element of associated information may be an address of the location. The method may comprise responding to user selection of the first element to open a map application and to indicate the location on the map.

The method may comprise:
  causing a search field for receiving a search string to be displayed on a same display area as the list of search results;
  causing a soft keypad for entering the search string to be displayed on the same display area as the list of search results; and
  causing removal of the soft keypad in response to a user initiated scroll command.

The method may comprise performing the method on a touch screen device and wherein the user initiated scroll command may be a touch screen input.

The method may comprise performing the method on a mobile telephone.

The method may comprise:
responding to a user initiated zoom-in command by increasing the number of elements of associated information that are caused to be displayed for each search result.

The method may comprise:
responding to a user initiated zoom-out command by decreasing the number of elements of associated information that are caused to be displayed for each search result.

The method may comprise:
responding to user selection of a function key adjacent each search result to cause a primary function associated with each respective search result to be executed.

The specification also provides a computer program comprising instructions that when executed by computer apparatus control it to perform the method above.

A third aspect of the specification provides apparatus comprising:
means for causing a list of search results to be displayed, each of the search results being caused to be displayed with a number of elements of associated information, wherein the number is greater than or equal to zero;
means for, causing after a predetermined time period in which no user input is received, the number of elements of associated information that are displayed for each of plural ones of the search results to be increased; and
means responsive to a user initiated scroll command after the number of elements of associated information that are caused to be displayed for each of plural ones of the search results has been increased for causing the number of elements of associated information that are displayed to be decreased.

A fourth aspect of the specification provides a non-transitory computer-readable storage medium having stored thereon computer-readable code, which, when executed by computing apparatus, causes the computing apparatus to perform a method comprising:
causing a list of search results to be displayed, each of the search results being caused to be displayed with a number of elements of associated information, wherein the number is greater than or equal to zero;
after a predetermined time period in which no user input is received, causing the number of elements of associated information that are displayed for each of plural ones of the search results to be increased; and
in response to a user initiated scroll command after the number of elements of associated information that are caused to be displayed for each of plural ones of the search results has been increased, causing the number of elements of associated information that are displayed to be decreased.

A fifth aspect of the specification provides apparatus, the apparatus having at least one processor and at least one memory having computer-readable code stored thereon which when executed controls the at least one processor:
to cause a list of search results to be displayed, each of the search results being caused to be displayed with a number of elements of associated information, wherein the number is greater than or equal to zero;
after a predetermined time period in which no user input is received, to cause the number of elements of associated information that are displayed for each of plural ones of the search results to be increased; and
to respond to a user initiated scroll command after the number of elements of associated information that are caused to be displayed for each of plural ones of the search results has been increased by causing the number of elements of associated information that are displayed to be decreased.

The computer-readable code when executed may control the at least one processor, after causing the number of elements of associated information that are displayed for each of plural ones of the search results to be increased, to respond to expiry of a second predetermined time period in which no user input is received by causing the number of elements of associated information that are displayed for each of plural ones of the search results to be further increased.

A first item in the list of search results may be a contact name and a first element of associated information for the first item in the list may be a primary phone number of the contact. Another element of associated information of the first item may be an email address of the contact.

The computer-readable code when executed may control the at least one processor to respond to user selection of an element of associated information displayed in the list of search results by activating a corresponding function.

An element of associated information may be an address of the location and the computer-readable code when executed may control the at least one processor to respond to user selection of the first element to open a map application and to indicate the location on the map.

The computer-readable code when executed may control the at least one processor:
to cause a search field for receiving a search string to be displayed on a same display area as the list of search results;
to cause a soft keypad for entering the search string to be displayed on the same display area as the list of search results; and
to cause removal of the soft keypad in response to a user initiated scroll command.

The apparatus may be a touch screen device and wherein the user initiated scroll command may be a touch screen input.

The apparatus may be a mobile telephone.

The computer-readable code when executed may control the at least one processor:
to respond to a user initiated zoom-in command by increasing the number of elements of associated information that are caused to be displayed for each search result.

The computer-readable code when executed may control the at least one processor:
to respond to a user initiated zoom-out command by decreasing the number of elements of associated information that are caused to be displayed for each search result.

The computer-readable code when executed may control the at least one processor:
to respond to user selection of a function key adjacent each search result to cause a primary function associated with each respective search result to be executed.

BRIEF DESCRIPTION OF THE DRAWINGS

Embodiments will now be described, by way of example only, with reference to the accompanying drawings, in which.

DETAILED DESCRIPTION OF PREFERRED EMBODIMENTS

Figure 1:
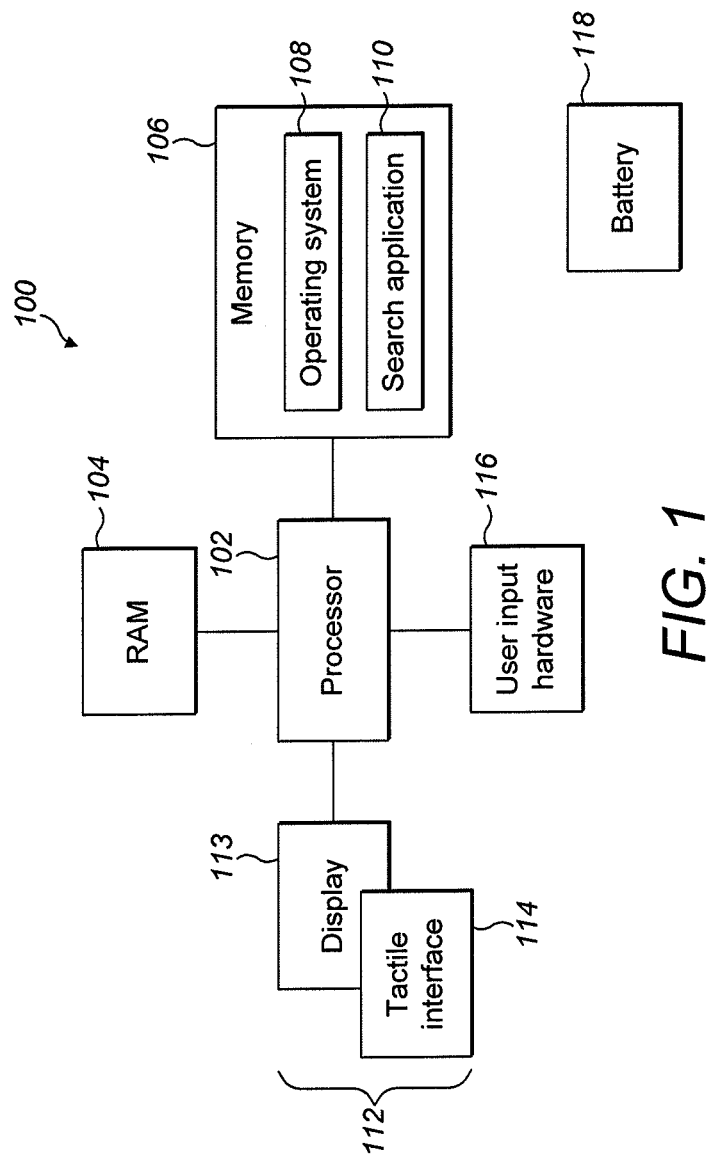
FIG. 1 is a block diagram of internal components of a terminal according to aspects of the invention.

Referring firstly to FIG. 1, a block diagram illustrating internal components of a terminal 100 is shown. The terminal includes a processor 102. The processor 102 controls operation of the other hardware components of the terminal 100. The processor 102 and other hardware components may be connected via a system bus (not shown). Each hardware component may be connected to the system bus either directly or via an interface. The terminal comprises working or volatile memory, such as Random Access Memory (RAM), 104 and a non-volatile memory 106. The non-volatile memory 106 stores an operating system 108 and a search function 110, which may or may not be a distinct application, as well as storing data files and associated metadata. The terminal comprises a display 112. The display may be a touch sensitive display having a display part 113 and a tactile interface part 114. The terminal may comprise one or more examples of user input hardware 116, such as hardware keys. The terminal 100 also houses a battery 118 to power the terminal 100.

The processor 102 is configured to send and receive signals to and from the other components in order to control operation of the other components. For example, the processor 102 controls the display of content on display 112 and receives signals as a result of user inputs from tactile interface 114. The display 112 may be a resistive touch screen or capacitive touch screen of any kind. The display may alternatively not be a touch screen. For instance it may be a liquid crystal display (LCD)

The user input hardware 116 may refer to hardware keys and may also include a QWERTY or numeric keypad, a trackpad, a movement or proximity detector, a remote control or a microphone. The user input hardware 116 functions in addition to the touch sensitive display 112, which also receives user inputs.

The terminal 100 may be a mobile phone, PDA or tablet computer of any kind. Other standard or optional components of the terminal 100, such as transceivers and cameras, are omitted. The processor 102 may be an integrated circuit of any kind. The processor 102 may access RAM 104 in order to process data and may control the storage of data in memory 106. Memory 106 may be a non-volatile memory of any kind such as a Read Only Memory (ROM), a flash memory and a magnetic drive memory. The RAM 104 may be a RAM of any type, for example Static RAM (SRAM), Dynamic RAM (DRAM) or a Flash memory.

The processor 102 operates under control of the operating system 108. The operating system 108 may comprise code relating to hardware such as the display 112 and user inputs 116, as well as the basic operation of the terminal 100. The operating system 108 may also cause activation of other software modules stored in the memory 106, such as the search function 110.

The search function 110 comprises software which receives search strings, accesses data files and metadata stored in the memory 106 and/or on a networked or cloud based storage medium, configures data for display and that causes the processor 102 to control what is output on the display 112. For example, the search function 110 may receive a user entered search string, search an area of the memory 106 storing data files, configure a list of search results comprising representations of a subset of the searched data files and control the processor 102 to cause the list to be displayed on the display 112. The term "search result" as used herein refers to a data file or set of data files represented by words and/or symbols on a display. The search function 110 may also control the processor 102 to cause a search application GUI to be displayed. The search function 110 may be activated in response to a specific user command, or it may activate automatically upon start-up of the terminal 100 and remain active. The search function 110 may additionally be configured to search a remote memory such as a networked drive or a cloud based network, to receive a list of search results from the remote memory and to cause the list to be displayed.

In some embodiments, the search function 110 is also responsive to a user selection of a displayed search result to control the processor 102 to activate an associated function of the terminal 100. The search function 110 also controls the processor 102 to display more or less associated information for each search result, in response to user inputs or other factors, as described in greater detail below.

Figure 2:
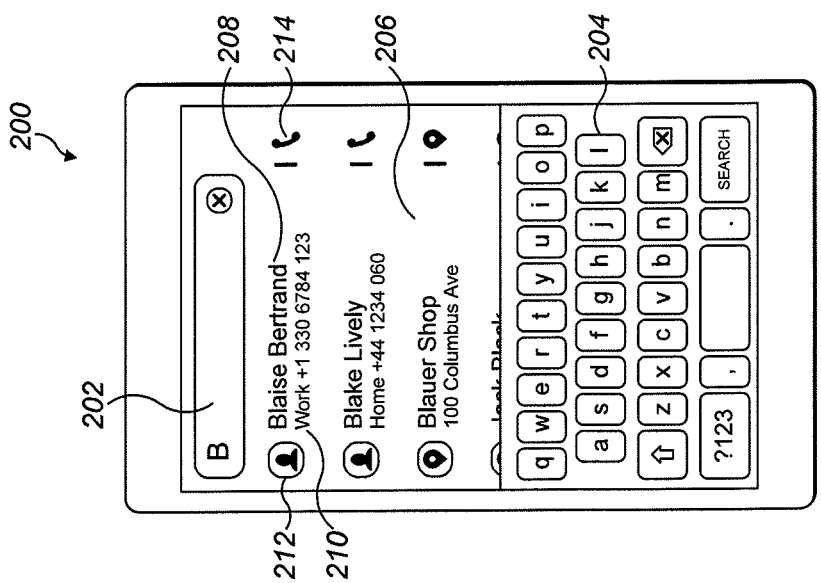

FIGS. 2 to 7c show various screen configurations which the search function 110 may control the display 112 to assume. Referring now to FIG. 2, a first screenshot 200 is shown being displayed on the display 112 of the terminal 100. The first screenshot 200 shows a GUI of the search function 110. The GUI comprises a search field 202 into which a search string can be entered. The search field 202 may be at the top edge of the display 112. The GUI may optionally comprise a search soft key for initiating a search and a cancel soft key for cancelling an ongoing search. A user of the terminal 100 may have performed a specific action to activate the search function 110, or the GUI of the search function 110 may be displayed automatically when the terminal 100 is in certain modes.

The GUI may also comprise a soft keypad 204. A soft keypad, also known as a virtual keypad, is a keypad that is displayed and comprises soft (virtual) keys instead of hardware keys. The soft keypad 204 may be displayed when the search function 110 is activated or, if the search function 110 is already active, when a user selects the search field 202 or otherwise enters a search string. The soft keypad 204 allows a user to enter an alpha-numeric search string into the search field 202. In the first screenshot 200, a user has entered "B". The search function 110 has searched in the memory 106 and has controlled the processor 102 to cause a list of search results to be displayed in a search results window 206.

Each search result in the search result window 206 may comprise a title 208 identifying the search result, a first element of associated information 210 displayed under the title 208, an icon 212 identifying the category of the search result and a function key 214. Each search result may comprise one or more of the above parts. For example, each search result may comprise only a title 208. It may alternatively include only a title 208 and a first element of associated information 210. In these examples, the icon 212 and function key 214 are optional features. The term "associated element of information" as used herein refers to individual items of data, individual data files or sets of data files represented by words and/or symbols on a display. The function key 214 may relate to the primary function of each search result. Selection of the function key 214 by a user may cause the primary function associated with that search result to be executed. As will be seen, the parts that comprise a search result can vary during operation.

Referring to the first screenshot 200, an example is depicted in which the first search result is a contact having a title 208 "Blaise Bertrand". The icon 212 displayed next to the title 208 indicates that this search result is a contact. The first element of associated information 210 is a primary phone number of the contact, in this instance a work phone number. The function key 214 is a telephone graphic, indicating that selection of the function key will cause the terminal 100 to dial the primary phone number of the contact.

In some embodiments, the search function 110 is configured to begin searching and to control the processor 102 to display the results of the search as soon as any search string is entered into the search field 202. As a user continues to enter characters into the search field 202, the search is re-performed and the search results updated.

Figure 3:
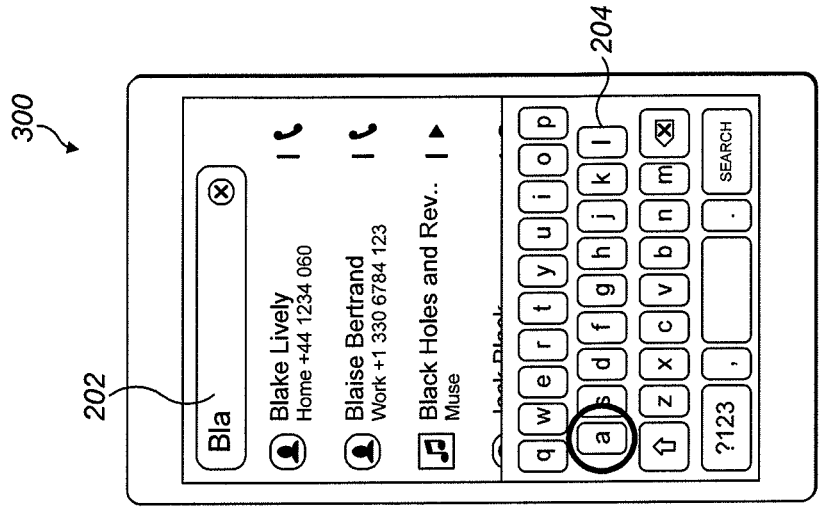
FIGS. 2 to 7c show various screen configurations which the terminal may be controlled to display.

Referring to FIG. 3, a second screenshot 300 is shown in which a user has entered the search string "Bla". A number of criteria may be used to determine the order in which the search results are presented. For example, relevancy rules may be used to determine the order. Relevancy rules may be based on the usage history of the terminal 100, for example a more regularly called contact or a more regularly played album appears higher on the list. Relevancy rules may also be based on calendar events, for example events occurring soon may appear higher on the list than events occurring later. Furthermore, if a contact is associated with an event, for example if the user of the terminal 100 has specified that the contact will be in attendance at the event, then that contact appears higher on the list. If the search result is a location marker or has a location associated with it, then the current location of the terminal 100 may be used so that closer locations appear higher on the list. The time elapsed since the content relating to a search result was last accessed may also be used to determine the relevancy of the search result. A combination of any of these criteria may be used. In the absence of any relevancy criteria, or in the case that these criteria are not used, then the search results are presented in another order, for instance alphabetical order. The search results may be presented in a continuous list. If there are too many search results to be displayed at once in the search results window 206, then the user can cause the list to scroll. The results may wrap around such that that first result on the list is displayed again after the last result on the list.

Figures 4, 5:
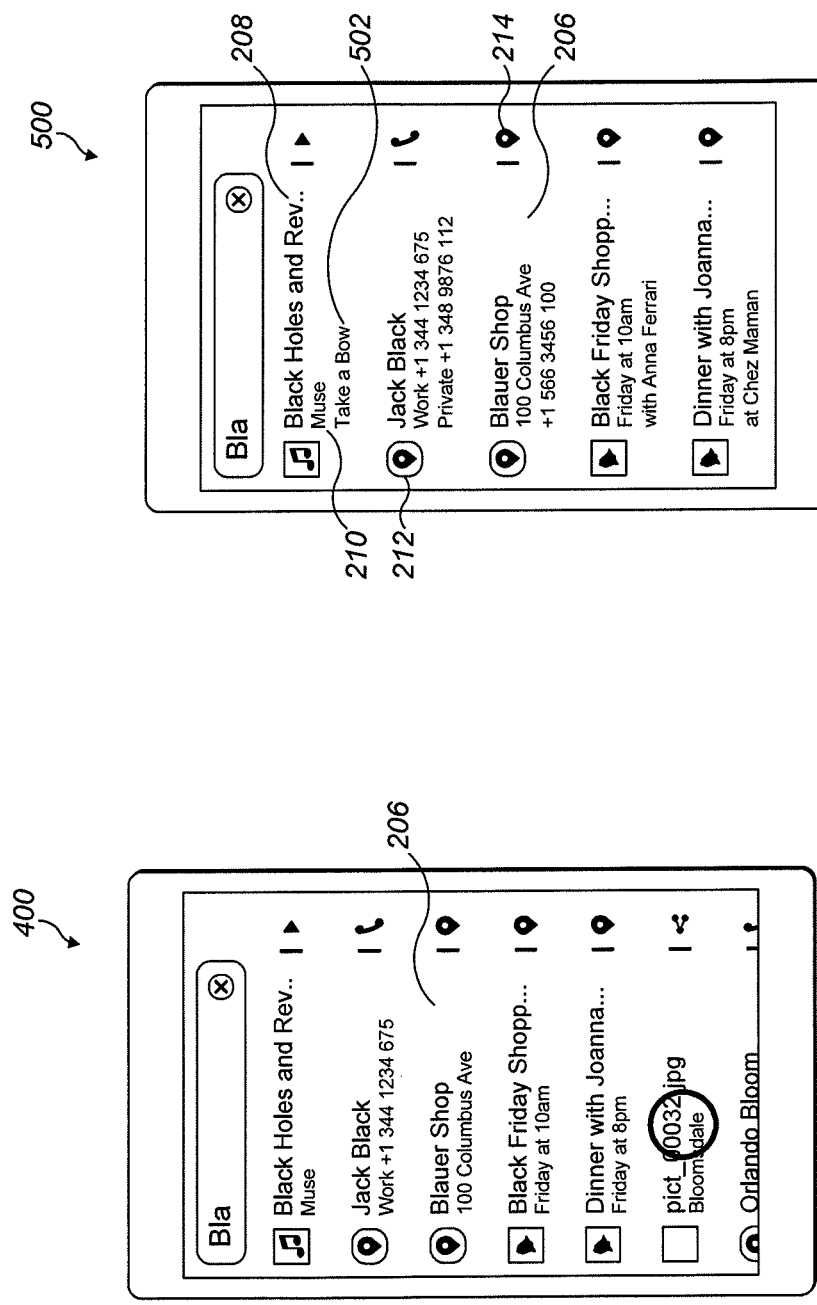

Referring to FIG. 4, a third screen shot 400 is shown in which the soft keypad 204 has been removed, allowing more of the search result window 206 to be viewed. The soft keypad 204 may be removed in response to a scroll command input initiated by the user of the terminal 100. For example, the user may provide a vertical touch input movement in the search results window 206, causing the soft keypad 204 to be dismissed. The scroll command input may alternatively be in the form of a hardware key press or a voice command. The circle superimposed on the screenshots 300, 400 illustrates a user touch input. Alternatively, or in addition, the soft keypad 204 may be dismissed when the user selects the "search" soft key (if present).

A problem with the list shown in FIGS. 2 to 4 is that only a limited amount of information associated with each search result is displayed. This is due to the limited size of the display 112 and the need to show a number of results simultaneously. Thus the user does not have access to all of the information relating to a particular search result until that search result is selected.

The search function 110 is configured to cause further elements of associated information to be displayed for each of the search results while the terminal 100 is "idling", i.e. when the terminal 100 receives no user inputs of a defined type for a predetermined length of time.

FIG. 5 shows a fourth screenshot 500 which is displayed after the search function 110 has caused a second element of associated information 502 to be displayed for each search result. Each search result in the search result window 206 now comprises a title 208, a first element of associated information 210 displayed under the title 208, a second element of associated information 502 displayed under the first element of associated information 210, an icon 212 identifying the category of the search result and a function key 214. Thus the user of the terminal 100 is now presented with more relevant information for each search result. Each search result now occupies more space in the search results window 206, and so fewer search results are displayed simultaneously.

The predetermined time period in which no user input of a defined type is received may be any suitable time period, for example 1 or 2 seconds. The defined type of user input may include a scroll command input. This may be in the form of a touch screen finger swipe in the search results window 206, a hardware key press, a voice command or any other suitable input method. The defined type of user input may also include further character entry into the search field 202 via the soft keypad 204. Other input types, for example a touch input not within the search results window 206 or a hardware key press to change a volume level of the terminal 100 may not trigger a resetting of the time period. Alternatively, all input types may trigger a resetting of the time period.

The nature of the second element of associated information 502 may depend on one or more of the search result category, the first element of associated information 210 which is already displayed and the available associated information for each individual search result. For example, the first search result visible in the fourth screenshot 400 is an album. This is indicated by the icon 212 which shows musical notes. The title 108 of this search result is the album title. The first element of associated information 210 is the album artist. The second element of associated information 502 is the first track of the album. As a further example, the third search result visible in the fourth screenshot 400 is a location marker, in this case marking the location of a shop. The title 108 of this search result is the location name. The first element of associated information 210 is the address of the location. The second element of associated information 502 is a phone number associated with the location. However, if a contact had been associated with this location, the name of the contact may be displayed as the second element of associated information 502, instead of the phone number.

Figure 6B:
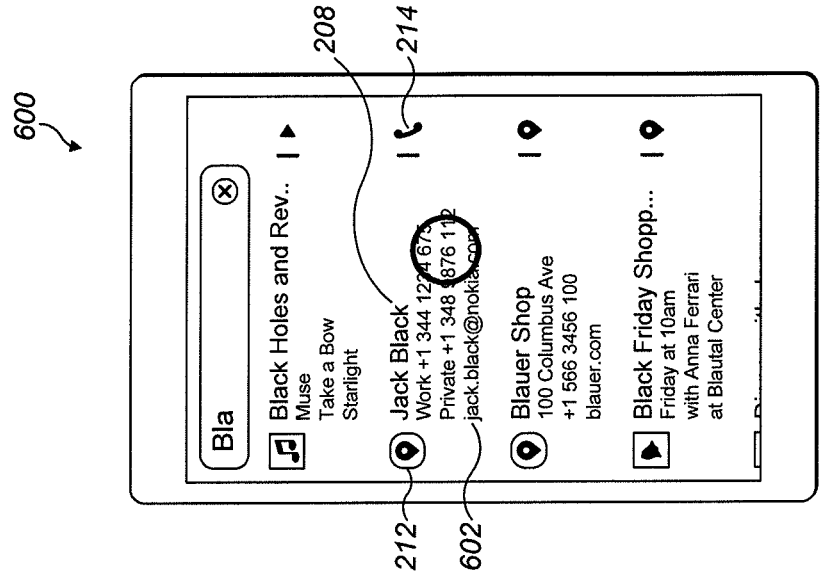
Figure 6A:
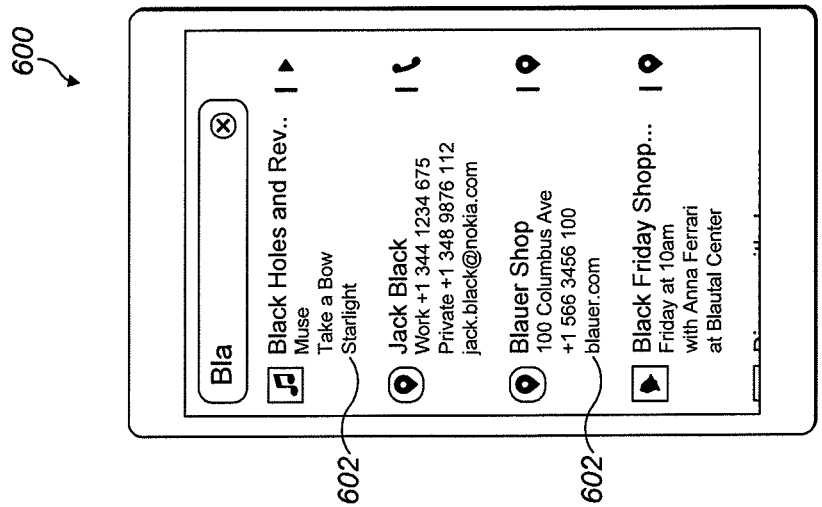

Referring to FIGS. 6a and 6b, a fifth screenshot 600 is shown in which a third element of associated information 602 is displayed. If a user continues to idle while the search results are displayed as in the fourth screenshot 500, then the search function 110 is configured to cause a third element of associated information 602 to be added for each search result.

The third element of associated information 602 is added when the terminal 100 receives no user inputs of a defined type for a predetermined length of time after the second element of associated information 502 is added. The predetermined length of time may be the same or different from that described above in relation to the addition of the second element of associated information 502. The defined type of user input may also be as described in detail above.

As before, the nature of the third element of associated information 602 may depend primarily on the search result category, and also on the information which is already displayed and which is available but not yet displayed. For example, the second search result visible in the fifth screenshot 400 is a contact. This is indicated by the icon 212 which shows a human silhouette. The title 108 of this search result is the name of the contact. The first element of associated information 210 is a primary phone number of the contact. The second element of associated information 502 is a secondary phone number of the contact. The third element of associated information 602 is an email address of the contact.

The process of adding more elements of associated information to each search result may continue until all of the pertinent information for each search result is displayed. For example, a contact may have several different phone numbers, an email address, an instant messaging (IM) address (such as a Skype™ name), a physical address and a personal website. The order in which the elements of associated information appear is defined by the category of the search result and may also be defined by relevancy rules, for example which of a contact's phone numbers a user most regularly calls.

The search function 110 may continue to add the elements of associated information until all are displayed, or the number of elements of information for each search result may be capped, for example at 4 or 5. The number of elements of information may be capped at different levels depending on the search result category. For example, where the search result is a calendar event, the number of elements of associated information may be capped at 3 (e.g. a date/time, a location and an associated contact), even if more information is available. If no contact is associated with the event, the number may be capped at 2. Where the search result is a contact, which may have several phone numbers, email addresses and the like, the maximum number of elements may be 5 or higher.

The maximum number of elements of associated information displayed for each category of search result, as well as the order in which they are displayed and the predetermined idling time intervals may be determined and updated automatically by the search function 110. In addition these variables may be set and adjusted by a user of the terminal 100 via a settings menu.

If at any point, the user inputs a new scroll command, then the search function 110 is configured to cause the number of displayed elements of associated information to be reduced back to one. Therefore any scroll input received while the display is in the format shown in the fourth or fifth screenshots 500, 600 causes the display to revert to the format shown in the third screenshot 400. Thus the user is able to view a large number of search results while scrolling the list but is also able to view a much greater amount of information about each search result when not scrolling the list. Switching from viewing many search results to viewing more information for each search result is an intuitive process for the user.

FIG. 6b shows the same fifth screenshot 600, with a circle illustrating a user touch input superimposed. As well as displaying further information about a search result, each of the elements of associated information may be responsive to direct user selection for carrying out a related function (also referred to herein as a corresponding function). The related function may be the function most closely connected to the associated information. For example a touch input on the secondary phone number of the contact "Jack Black" causes that number to be dialled. Similarly a touch input on an email address or IM address causes an email or IM application to be opened with the selected email or IM address as the recipient while a touch input on a website causes a browser to be opened and to navigate to the website. If the associated information is an address or a location marker, selection of the address or location name causes a map application to be opened and the address or location indicated on the map. If the associated information is a track from an album, selection of the track causes that track to be played.

Each of the other parts of the search results may also be responsive to selection. User selection of the title 208 (i.e. the search result itself) may cause the data relating to the search result to be displayed using an appropriate application. For example, selection of the contact name "Jack Black" may cause the terminal to navigate to the contact card for Jack Black, where all of that contact's information can be viewed. Selection of the title 208 of a meeting or other calendar event may cause the terminal to navigate to a calendar application and to select the day of the event. As a further example, selection of the title 208 of an album may cause the terminal to navigate to a media player and to begin playing the album. Selection of the icon 212 may have the same effect as selection of the title 208, or it may have no effect.

The function key 214 may relate to the primary function associated with each search result. For some search results, selection of the function key 214 may have the same effect as selection of the first element of associated information 210. For some other search results, selection of the function key 214 may have the same effect as selection of the second, third or fourth element of associated information. For example, if the search result is a contact, the first element of associated information 210 may be a primary telephone number for that contact. Selection of the function key 214 causes the primary phone number of the contact to be dialled. As a further example, if the search result is a location marker, the first element of associated information 210 may be an address of the location. Selection of the function key 214 causes a map application to be opened and to navigate to the address of the location marker. As a further example, if the search result is a calendar event, the first element of associated information 210 could be a date and time of the event. The second element of associated information could be a location associated with the event or a contact associated with the event. Selection of the function key 214 may cause a map application to be opened and to navigate to the location if the second element of associated information is a location. Selection of the function key 214 may cause the contact card for that contact to be displayed if the second element of associated information is a contact. This function allows a user to quickly and directly initiate an action related to a search result from the search result list, without having to navigate away from the search result list.

Figure 7C:
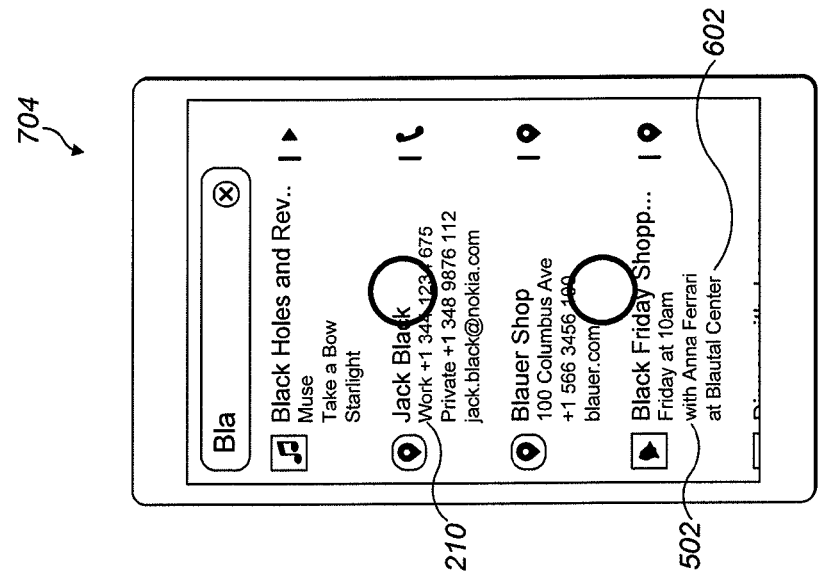
Figure 7B:
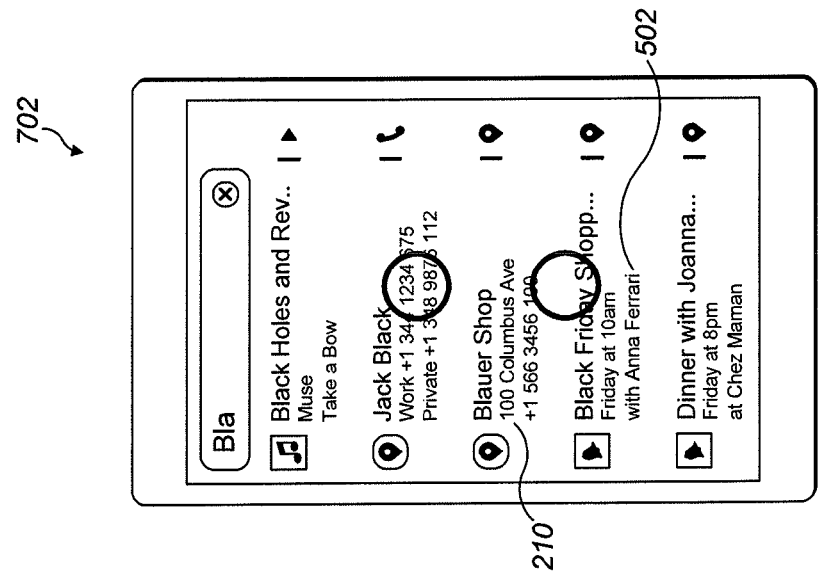
Figure 7A:
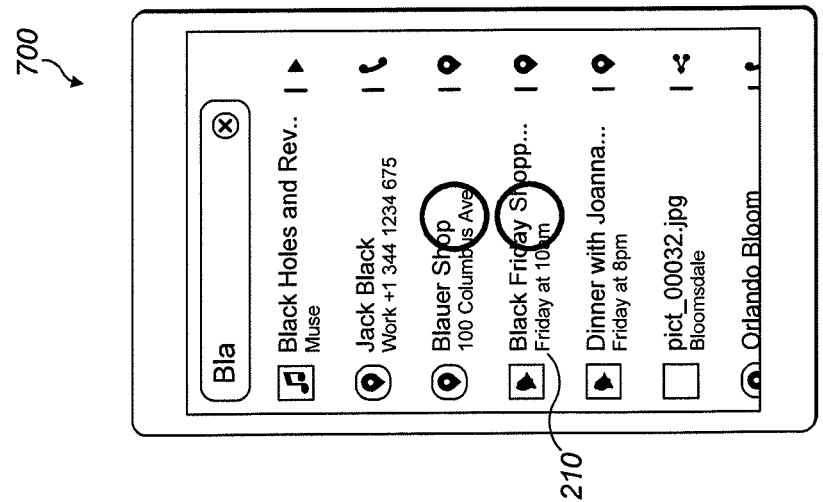

Referring now to FIGS. 7a to 7c, a further feature of the terminal 100 is illustrated. FIG. 7a shows a sixth screenshot 700. The sixth screenshot 700 has the same format as the third screenshot 400 in that only the first element of associated information 210 is displayed for each search result. However a user, particularly a user who is familiar with the function of the search function 110, may not want to idle in order to view more information about each search result.

The user can therefore force more elements of associated information to be displayed by providing a double touch input and moving the inputs apart. This type of user input is commonly used on touch screen devices to zoom in. A user may therefore find it intuitive to use this type of input to cause more detailed information to be displayed.

FIG. 7b shows a seventh screenshot 702 in which the double touch inputs have been moved apart a small distance. This causes the second element of associated information 502 to be displayed for each search result. FIG. 7c shows an eighth screenshot 704 in which the double touch inputs have been moved apart by a larger distance. This causes the third element of associated information 602 to be displayed for each search result.

This process can also be performed in reverse. If a user provides a "pinch" input (a double touch input where the inputs move towards each other), then fewer elements of associated information are displayed. If the user forces more elements of associated information to be displayed using the zoom touch gesture, the removal of the additional information when scrolling may be disabled. Thus, a user may use the zoom touch input to force more information to be displayed for each search result, and may then scroll through the search results while maintaining the additional elements of associated information.

Figure 8:
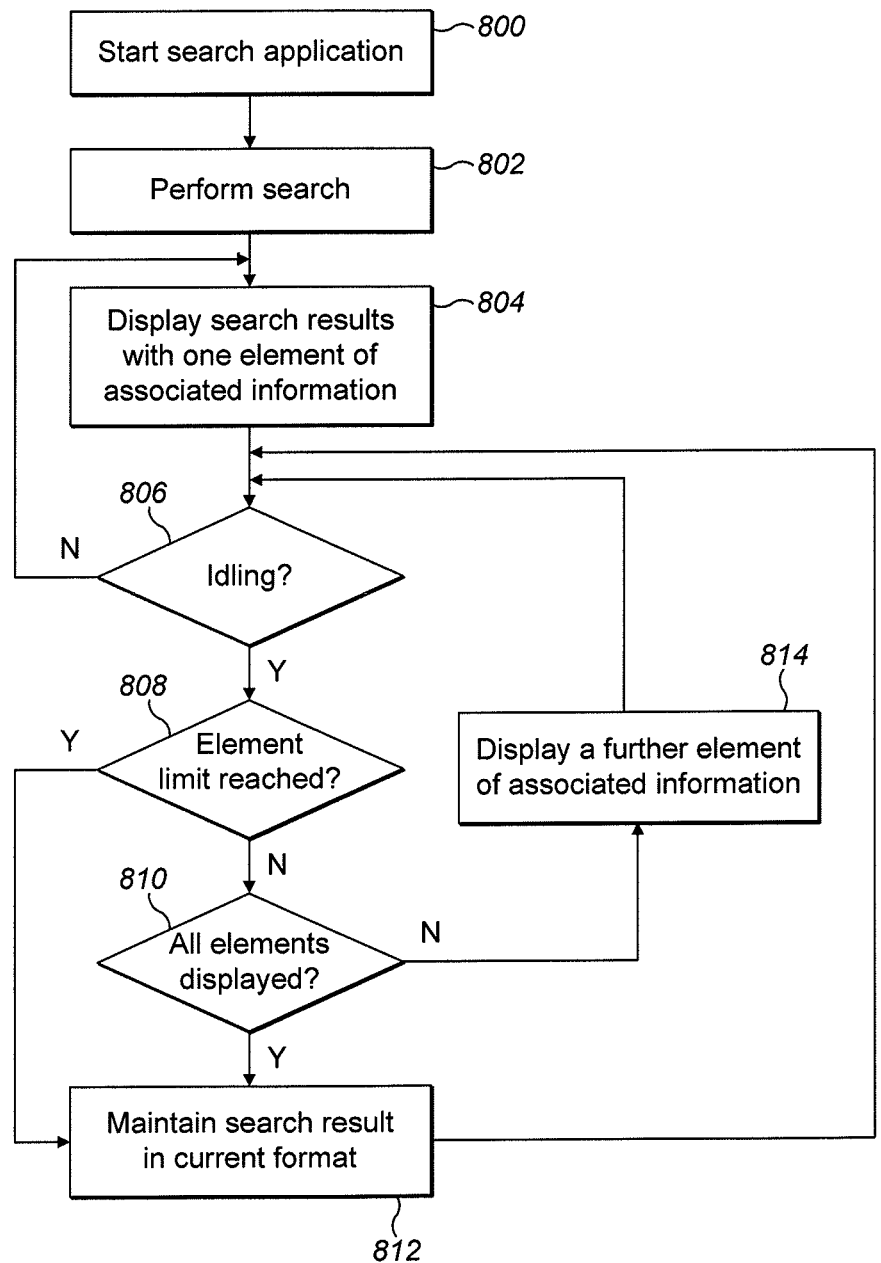
FIG. 8 is a flowchart illustrating exemplary operation of the terminal.

Referring now to FIG. 8, a flow chart is shown illustrating exemplary operation of the search function 110. At step 800 the search function 110 is started. This may occur automatically when the operating system 108 performs a specific action or when another software application is started. The search application may also be started in response to a user input. At step 802 a search is performed. As described previously, the search may be performed continuously on whatever search string that has been entered into the search field 202.

At step 804 the results of the search are displayed in the search results window 206. Each result on the list is displayed with one element of associated information. This format is shown in FIGS. 2 to 4. At step 806 it is determined by the search function 110 (using the processor 102) whether the terminal 100 is idling. This involves determining whether the terminal 100 receives user inputs of a defined type within a predetermined time period. The time period is calculated from the moment at which the search results are displayed in step 804, or alternatively from the time at which the user input terminated. The defined type of input may be a scroll input. If a scroll input is received within the predetermined time period, it is determined that the terminal 100 is not idling. The process returns to step 804 in which the search results are displayed with only one element of associated information. Monitoring for a scroll input within the time period may be effected by resetting and starting a timer at the beginning of the time period and determining whether a scroll input is received before the timer expires. If the timer expires before the scroll input is received, it is determined that the terminal 100 is idling. As mentioned above in relation to earlier Figures, other inputs may in some embodiments give rise to resetting of the timer.

If no scroll input is received within a predetermined time period after the search results are displayed, it is determined at step 806 that the terminal is idling and the process proceeds to step 808. At step 808 it is determined by the search application whether a limit on the number of displayed elements of associated information has been reached. Step 808 is an optional step and is performed for each of the search results individually. If the limit has been reached then the process proceeds to step 812 in which the specific search result concerned is maintained in an unchanged format. For example, the settings for a certain category of search result may mean that only one element of associated information is to be displayed. Therefore, even if it is determined that the terminal 100 is idling at step 806, the element limit has been reached and no further elements of associated information are displayed for this search result.

If step 808 is not performed, or if the result of the determination of step 808 is negative, the process goes to step 810 in which it is determined if all available elements of associated information are displayed. Step 810 is performed for each of the search results individually because each search result may have a different amount of associated information available. If all of the available elements of associated information for a specific search result are being displayed, then the process proceeds to step 812 and that search result is maintained in its current display format. If it is determined that some available elements of associated information are not being displayed, the process proceeds to step 814. At step 814 a further element of associated information is added to the specific search result. Step 814 is represented by a change in format from, for example, FIG. 4 to FIG. 5, or from FIG. 5 to FIG. 6a. The additional element of associated information is added underneath the last element of associated information currently displayed. As each search result may have a different amount of associated information available, the determination at step 810 may be negative for some of the displayed search results and positive for others.

After either step 812 or step 814, the process returns to step 806. Here, the timer is restarted and it is determined whether a scroll input is received before the timer expires. Detection of a non-scroll input resets the timer. Thus the determination of whether the terminal 100 is idling is performed repeatedly. If no user scroll inputs are received for a long period of time, then steps 806 to 810 and 814 are performed repeatedly until the element limit for each search result is reached or all of the available elements of associated information are displayed. After this, step 814 is not performed and steps 806 to 810 and 812 are performed repeatedly. As soon as the determination at step 806 is negative, the process returns to step 804.

The flow chart has no end because the determination at step 806 is re-performed repeatedly while the search function 110 is active. The process ceases when the search function 110 is no longer active.

Figure 9:
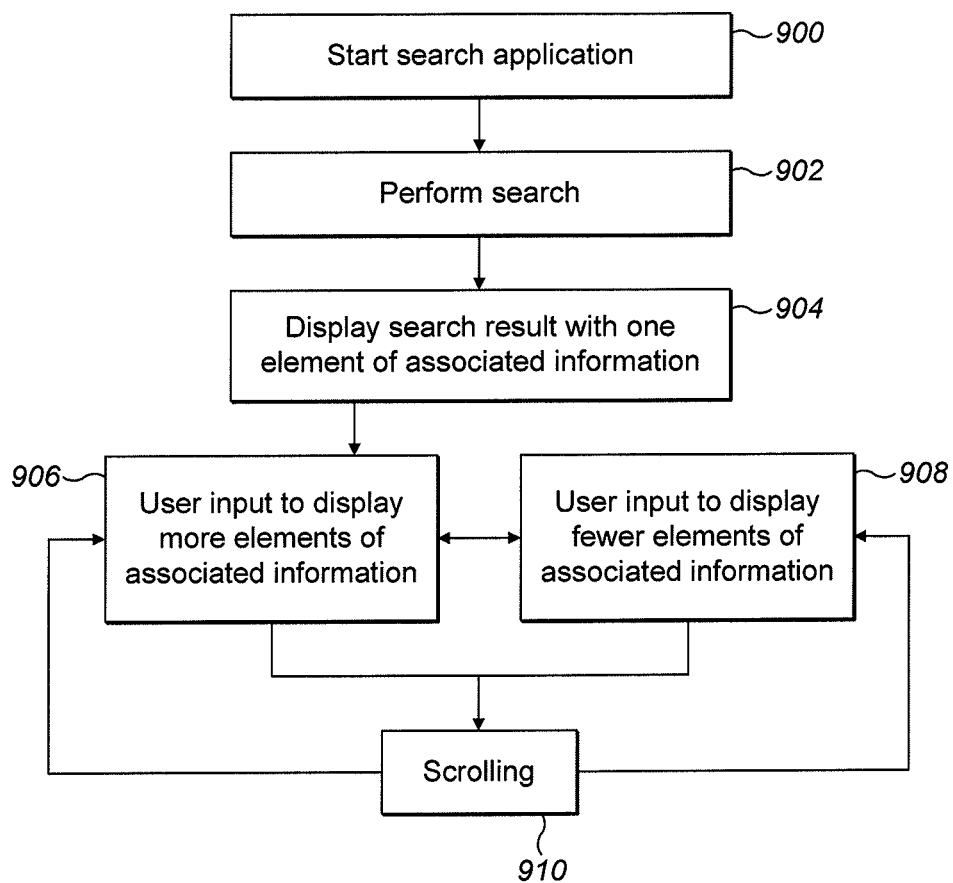
FIG. 9 is a flowchart illustrating further exemplary operation of the terminal.

FIG. 9 is a flowchart illustrating exemplary operation of the search function 110 when user inputs to increase or decrease the amount of displayed associated information are received. If a user forces more or fewer elements of associated information to be displayed using the zoom/pinch touch gestures described with reference to FIGS. 7a to 7c, then the determination of step 806 is suspended.

Referring to FIG. 9, steps 900, 902 and 904 are identical to steps 800, 802 and 804 respectively. At step 904, each search result is displayed with one element of associated information. In step 906 a user input to display more elements of associated information is received. This is illustrated by the transition from FIG. 7a to FIG. 7c. This action suspends the effect of the idling determination of step 806. A user may then provide an input to reduce the number of elements of associated information displayed for each search result in step 908. Steps 906 and 908 are reciprocal in that they have opposite effects, and performance of either one facilitates the other. A user may then scroll through the results at step 910. The results are scrolled with the number of elements of associated information resulting from either step 906 or 908 maintained. The user may continue to change the number of elements of associated information displayed after scrolling, i.e. the process may return to either step 906 or 908 depending on the user input. This process has no end and is terminated when the search application is no longer active.

It will be appreciated that the above described embodiments are purely illustrative and are not limiting on the scope of the claims. Other variations and modifications will be apparent to persons skilled in the art upon reading the present application.

For instance, although in the above primary description initially one element of associated information is displayed and more elements are displayed after idling is detected, this is only an example. Alternatively, more or fewer elements of associated information may be displayed initially, with the number increasing after idling is detected.

Also, although in the above the primary description is of the number of associated elements being displayed reverting to the initial number once further scrolling is detected, in other examples the number of associated elements being displayed once further scrolling is detected may be greater than or less than the original number. For instance, where the original number of associated elements is one, the number after scrolling may be reduced to zero or two.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

What is claimed is:

1. A method comprising:
   causing a list of search results to be displayed, each of the search results being caused to be displayed with a number of elements of associated information comprising data items, data files, or datasets, wherein the number is greater than or equal to zero, wherein each of the search results in the list is associated with a search result category, wherein a first search result is associated with a first search result category, and wherein a second search result is associated with a second search result category, different from the first search result category, wherein the first search result category comprises a contact, wherein the second search result category comprises a location name;
   after a predetermined time period in which no user input is received, causing the number of elements of associated information that are displayed for each of plural ones of the search results to be increased in response to the number of elements of associated information displayed for each of the plural ones of the search results not reaching a maximum number of elements of information for the associated search result category for each respective one of the plural ones of the search results, wherein causing the number of elements of associated information that are displayed to be increased comprises determining the elements of associated information for each of the search results based on the associated search result category, wherein a first information element associated with the first search result category is an email address or a phone number, and wherein a first information element associated with the second search result category is a location address; and
   in response to a user initiated scroll command after the number of elements of associated information that are caused to be displayed for each of plural ones of the search results has been increased, causing the number of elements of associated information that are displayed to be decreased.

2. A method according to claim 1, comprising, after causing the number of elements of associated information that are displayed for each of plural ones of the search results to be increased, responding to expiry of a second predetermined time period in which no user input is received by causing the number of elements of associated information that are displayed for each of plural ones of the search results to be further increased.

3. A method according to claim 1, wherein the first search result in the list of search results is a contact name and a first element of associated information for the first item in the list is a primary phone number of the contact.

4. A method according to claim 3, wherein another element of associated information of the first search result is an email address of the contact.

5. A method according to claim 3, wherein:
   the second search result in the list of search results is a location;
   an element of associated information is an address of the location; and wherein
   the method comprises responding to user selection of the first element to open a map application and to indicate the location on the map.

6. A method according claim 1, comprising responding to user selection of an element of associated information displayed in the list of search results by activating a corresponding function.

7. A method according to claim 1, comprising:
   causing a search field for receiving a search string to be displayed on a same display area as the list of search results;
   causing a soft keypad for entering the search string to be displayed on the same display area as the list of search results; and
   causing removal of the soft keypad in response to a user initiated scroll command.

8. A method according to claim 1, wherein the user input comprises the user initiated scroll command, and wherein causing the number of elements of associated information that are displayed for each of plural ones of the search results to be increased occurs after the predetermined time period in which no user initiated scroll command is received.

9. A method according to claim 1, wherein in response to a user input received of a first input type, restarting a time period after which the number of elements of associated information that are displayed for each of the plural ones of the search results are increased, and in response to a user input received of a second input type, failing to restart a time period after which the number of elements of associated information that are displayed for each of the plural ones of the search results are to be increased.

10. A method according to claim 9, wherein the first input type comprises an input received within the displayed search results, wherein the second input type comprises an input received outside of the displayed search results.

11. A method according to claim 1, wherein the maximum number of elements of information is different between the first search result category and the second search result category.

12. A non-transitory computer-readable storage medium having stored thereon computer-readable code, which, when executed by a computing apparatus, causes the computing apparatus to perform a method comprising:

causing a list of search results to be displayed, each of the search results being caused to be displayed with a number of elements of associated information comprising data items, data files, or datasets wherein the number is greater than or equal to zero, wherein each of the search results in the list is associated with a search result category, wherein a first search result is associated with a first search result category, and wherein a second search result is associated with a second search result category, different from the first search result category, wherein the first search result category comprises a contact, wherein the second search result category comprises a location name;

after a predetermined time period in which no user input is received, causing the number of elements of associated information that are displayed for each of plural ones of the search results to be increased in response to the number of elements of associated information displayed for each of the plural one of the search results not reaching a maximum number of elements of information for the associated search result category for each respective one of the plural ones of the search results, wherein causing the number of elements of associated information that are displayed to be increased comprises determining the elements of associated information for each of the search results based on the associated search result category, wherein a first information element associated with the first search result category is an email address or a phone number, and wherein a first information element associated with the second search result category is a location address; and in response to a user initiated scroll command after the number of elements of associated information that are caused to be displayed for each of plural ones of the search results has been increased, causing the number of elements of associated information that are displayed to be decreased.

13. Apparatus, the apparatus having at least one processor and at least one memory having computer-readable code stored thereon which when executed controls the at least one processor:

to cause a list of search results to be displayed, each of the search results being caused to be displayed with a number of elements of associated information comprising data items, data files, or datasets, wherein the number is greater than or equal to zero, wherein each of the search results in the list is associated with a search result category, wherein a first search result is associated with a first search result category, and wherein a second search result is associated with a second search result category, different from the first search result category, wherein the first search result category comprises a contact, wherein the second search result category comprises a location name;

after a predetermined time period in which no user input is received, to cause the number of elements of associated information that are displayed for each of plural ones of the search results to be increased in response to the number of elements of associated information displayed for each of the plural ones of the search results not reaching a maximum number of elements of information for the associated search result category for each respective one of the plural ones of the search results, wherein causing the number of elements of associated information that are displayed to be increased comprises determining the elements of associated information for each of the search results based on the associated search result category, wherein a first information element associated with the first search result category is an email address or a phone number, and wherein a first information element associated with the second search result category is a location address; and to respond to a user initiated scroll command after the number of elements of associated information that are caused to be displayed for each of plural ones of the search results has been increased by causing the number of elements of associated information that are displayed to be decreased.

14. Apparatus according to claim 13, wherein the computer-readable code when executed controls the at least one processor, after causing the number of elements of associated information that are displayed for each of plural ones of the search results to be increased, to respond to expiry of a second predetermined time period in which no user input is received by causing the number of elements of associated information that are displayed for each of plural ones of the search results to be further increased.

15. Apparatus according to claim 13, wherein the first search result in the list of search results is a contact name and a first element of associated information for the first item in the list is a primary phone number of the contact.

16. Apparatus according to claim 15, wherein another element of associated information of the first search result is an email address of the contact.

17. Apparatus according to claim 13, wherein the computer-readable code when executed controls the at least one processor to respond to user selection of an element of associated information displayed in the list of search results by activating a corresponding function.

18. Apparatus according to claim 13, wherein an element of associated information is an address of a location and wherein the computer-readable code when executed controls the at least one processor to respond to user selection of the first element to open a map application and to indicate the location on the map.

19. Apparatus according to claim 13, wherein the computer-readable code when executed controls the at least one processor:

to cause a search field for receiving a search string to be displayed on a same display area as the list of search results;

to cause a soft keypad for entering the search string to be displayed on the same display area as the list of search results; and to cause removal of the soft keypad in response to a user initiated scroll command.

20. Apparatus according to claim 13, wherein the computer-readable code when executed controls the at least one processor:

to respond to a user initiated zoom-in command by increasing the number of elements of associated information that are caused to be displayed for each search result.

21. Apparatus according to claim 13, wherein the computer-readable code when executed controls the at least one processor:

to respond to a user initiated zoom-out command by decreasing the number of elements of associated information that are caused to be displayed for each search result.

22. Apparatus according to claim 13, wherein the computer-readable code when executed controls the at least one processor:

to respond to user selection of a function key adjacent each search result to cause a primary function associated with each respective search result to be executed.

* * * * *